United States Patent Office 2,821,455
Patented Jan. 28, 1958

2,821,455

MORDANTING PROCESS AND PRODUCT

John P. Delangre, Los Angeles, Calif., assignor to Technicolor Corporation, Hollywood, Calif., a corporation of Maine No Drawing. Application August 17, 1954
Serial No. 450,549

2 Claims. (Cl. 8—4)

The present invention relates to a process of mordanting film, to a particular class of mordants for use in said process, and to the film products resulting therefrom, particularly for use with acid or direct dyes.

Heretofore film blanks have been treated with various mordant solutions including chrome and potassium alum, aluminum sulphate and metallic hydrous oxides. The definition or sharpness of the dye records transferred onto blanks in which such mordants are employed are at present not wholly satisfactory. This is particularly true when these imbibition prints are projected on large or wide screens such as are used in "Cinemascope" or in other wide screen projection schemes.

Therefore it is an object of the present invention to provide improved definition of dye records on film blanks and particularly dye records transferred onto imbibition blanks regardless of whether these prints are to be projected on conventional or wide screens. A further object is to provide a novel process for mordanting such blanks which results in improved blanks and superior prints after dye transfer.

In one aspect the present invention comprises a blank or a colored film (i. e. a blank having dye records transferred or printed thereon) comprising a colloid having dispersed therein as a mordant an insoluble dibiguanide metal chelate or complex.

In another aspect the colloid layer of a blank is treated (i. e. bathed) in a dilute aqueous solution of a dibiguanide acid salt. The soluble salt is then insolubilized or complexed in situ in the colloid layer of the blank by treating with a dilute aqueous solution of a metallic salt. The reaction between these two soluble compounds results in an insoluble dibiguanide metal chelate which is finely divided and evenly dispersed throughout the interstices of the colloid.

In the preferred embodiments the dibiguanides have the following general formulas

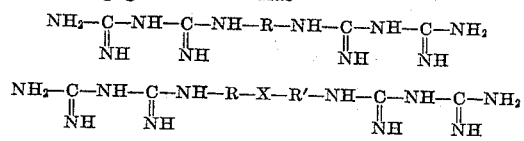

where R and R' are aromatic nuclei and X is a methylene (—CH₂—) group. These compounds may be prepared by reacting certain diamines with proper amounts of dicyandiamide in accordance with procedures described by Georg Cohen in the J. Parkt. Chem., col. 84, pages 394–401 (1911).

Diamines which when reacted with dicyandiamide result in dibiguanides having superior mordanting effect are 4,4' diamino diphenyl methane, benzidine, p-phenylene diamine, m-phenylene diamine, and 2,4-diamino toluene. Their reaction products and the preferred species of dibiguanides utilized in the present invention are 4,4' diphenyl methane dibiguanide, benzidine dibiguanide, p-phenylene dibiguanide, m-phenylene dibiguanide, and 2,4-toluene dibiguanide.

In order to achieve the necessary solubility when the colloid layer is initially treated with the dibiguanides these compounds are used as their water soluble acid salts, for instance as their hydrochlorides, sulfates, sulfamates or acetates.

The soluble metallic salts which are used to precipitate the dibiguanides and thereby form the chelate mordant in the blank emulsion are salts of copper, nickel and cobalt, preferably their sulfates, sulfamates, acetates or chlorides. The chelate forming metallic salts are joined to the dibiguanide molecule.

Although the process of the present invention is directed primarily to introducing a particular class of mordants into a colloid layer prior to the dye transfer operation, it can also be carried out by the processing of a blank which already contains a mordant whether introduced at the time of its manufacture or prior to the employment of the disclosed process.

In addition the mordanting process of the present invention is applicable whether the colloid be any gelatin, polyvinyl alcohol or a water soluble cellulose derivative or any other acceptable gelatin substitute.

The following specific example more clearly discloses the process of the present invention for the purpose of illustration.

In the case of 35 mm. motion picture blank having a light-sensitive positive emulsion, the process of the present invention is best carried out on a continuous film processing machine according to the following steps.

(1) The raw stock is printed with light through sound-track and frame-line negatives.

(2) On a normal film developing machine, the silver track and silver frame lines are developed in a normal black and white developer. The film is washed, fixed and washed again.

(3) The mordanting treatment can be carried out on the same film processing machine following the developing and fixing of the silver image. The film is treated for 50 seconds to 3 minutes in an aqueous solution containing from 1% to 6% 4,4'-diphenyl methane dibiguanide dihydrochloride. This solution can be used at a temperature from 85° F. to 90° F. at a pH between 4.5 and 6.5.

(4) The film is submitted to a short water rinse lasting from one to ten seconds at a temperature of 85° F. to 95° F. This rinse can be a simple treatment of the film through a tank of circulating water or a jet of water can be applied to the film from a nozzle.

(5) The film is treated in a 1% to 4% copper sulfate solution at a temperature of 85° F. to 95° F. for a time varying from 40 seconds to 3 minutes. The pH of such a solution can vary from 3.5 to 4.5.

(6) The film is then washed in water at a pH between 6.5 and 7.5 at a temperature between 85° F. to 90° F. for a time varying from 40 seconds to 3 minutes.

(7) The film is dried and is then ready for the dye transfer imbibition printing.

While step 3 involves a dibiguanide aqueous solution containing from 1% to 6% dibiguanide dihydrochloride, a preferred range is from 1 to 3% while optimum results are achieved when the amount of dibiguanide present is about 1%.

While the temperature ranges of steps 4 and 5 may vary from 85° F. to 95° F., optimum results are achieved when the solution temperatures are from 88° F.

It will be noted that the above disclosure is for the purpose of illustration only and that the invention includes all modifications and equivalents which fall within the scope of the appended claims.

I claim:

1. A film blank for making dye transfer color prints comprising, dispersed within a gelatin layer as a mordanting agent, an insoluble metal chelate formed by the reaction of copper sulfate and 4,4'-diphenyl methane dibiguanidine dihydrochloride.

2. The process of preparing the gelatin layer of a film blank for dye transfer printing by incorporating therein in a mordanting agent, comprising the steps of treating the gelatin with an aqueous solution of an acid salt of 4,4' diphenyl methane dibiguanidine, and of insolubilizing said salt in situ with an aqueous solution of copper sulfate.

References Cited in the file of this patent

UNITED STATES PATENTS

| | | |
|---|---|---|
| 2,317,184 | Dreyfuss | Apr. 20, 1943 |
| 2,572,988 | Collins | Oct. 30, 1951 |